3,174,377
HYDRAULIC DIE CUTTING PRESS WITH MEANS FOR SIMULTANEOUS ADJUSTMENT OF CUTTING HEIGHT AND STROKE
Georg Lischer, Frankfurt am Main, Germany, assignor to Maschinenfabrik Moenus A.G., Frankfurt am Main, Germany, a firm
Filed Nov. 19, 1962, Ser. No. 238,335
8 Claims. (Cl. 83—525)

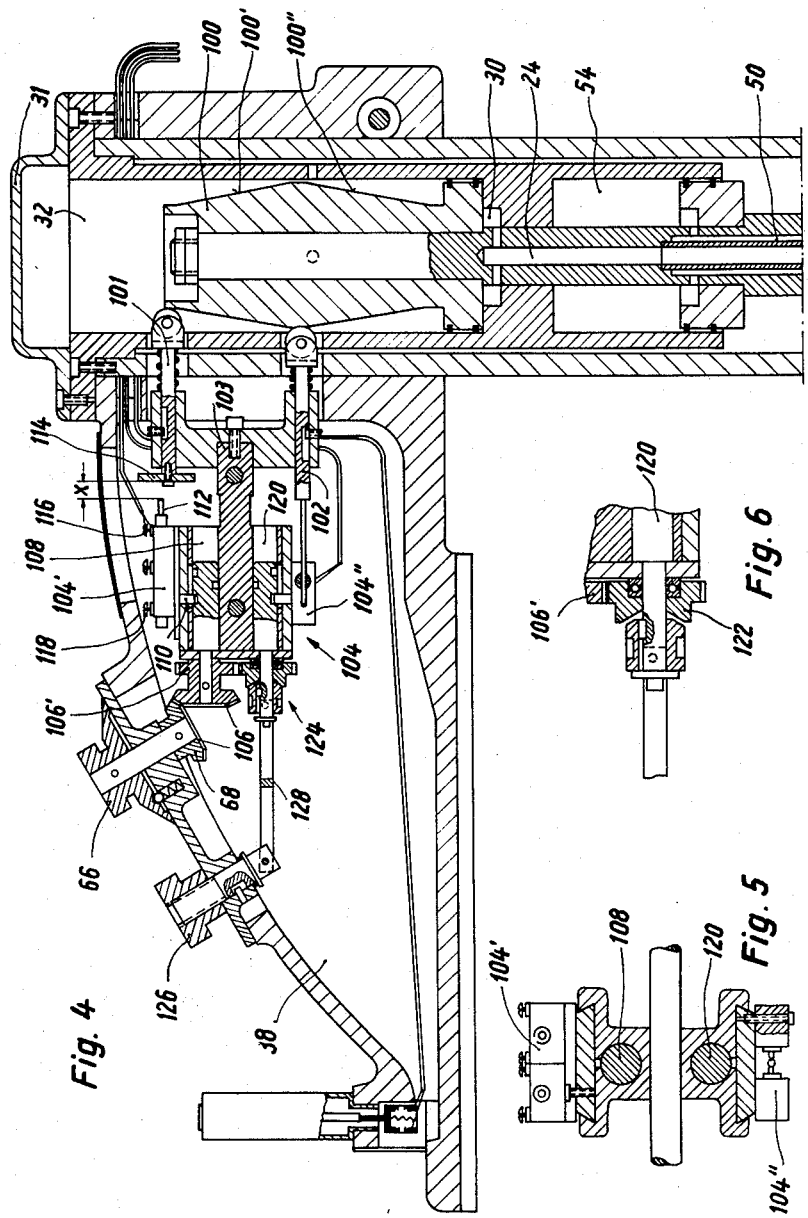

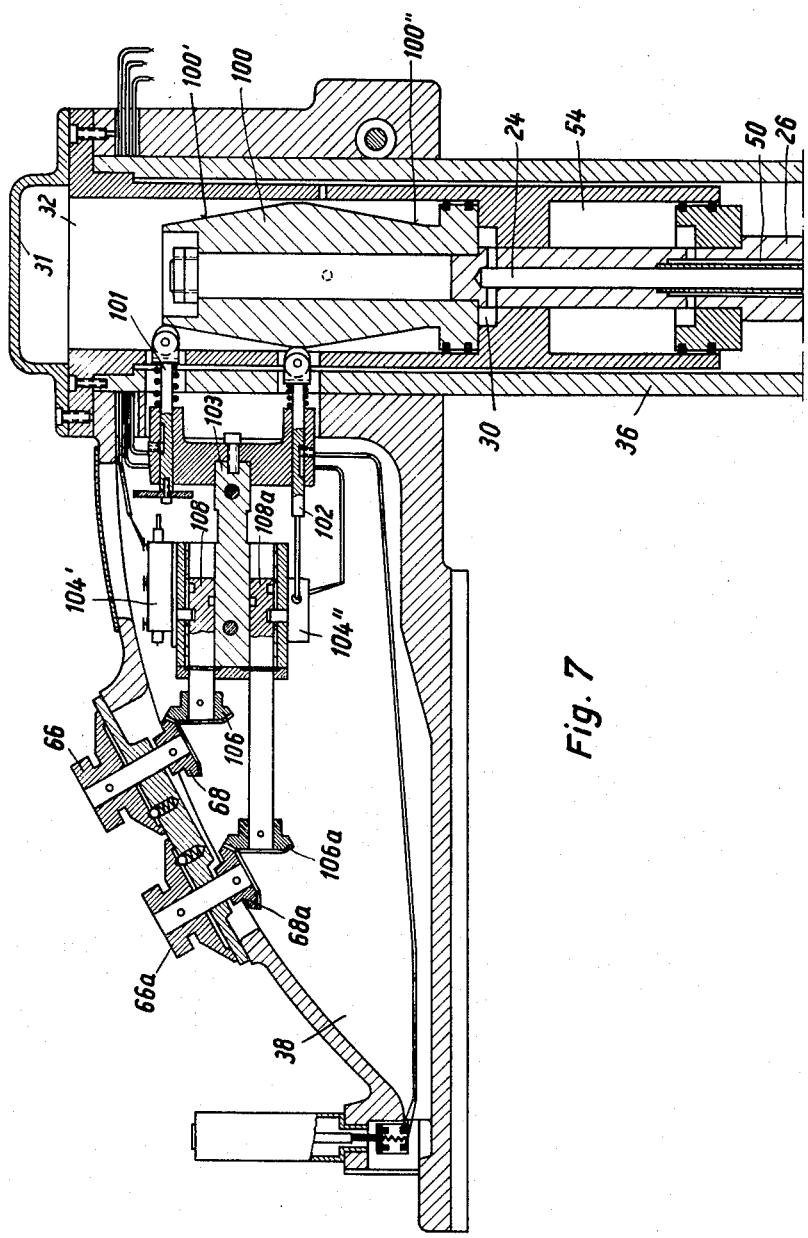

This invention relates to hydraulically operated and electrically controlled die cutting presses of the type known as clicking machines and in which is provided a cutting bed serving as a work support, a platen or swing arm mounted for movement across the cutting bed and for vertical movement toward and away therefrom for forcing a freely movable cutting die through a sheet of material supported on the cutting bed in order to produce blanks therefrom. Clicking machines of this type are usually provided with means for setting or adjusting the height of the platen or swing arm above the cutting bed and for adjusting the cutting stroke of the same.

Swing arm cutting presses of the said type are commonly provided with a hand-wheel at the top of a spindle in the back of the cutting bed above the same, by means of which the cutting height can be adjusted in accordance with the height of the dies or the thickness of the material to be cut. This way of adjustment, however, is exceedingly awkward and requires a considerable bodily strain on the part of the operator.

It is also known, in connection with hydraulically operated swing arm cutting presses, to arrange the pressure cylinder for initiating the cutting stroke and which is controlled by a solenoid valve within the column which carries the swing arm. But these known machines can only be said to operate semi-hydraulically since the parts by means of which the cutting stroke is effected must be returned, after the termination of the cutting stroke, into their initial position by a spring. However, since the parts to be thus returned are very heavy and the stroke sometimes very long, these springs must of necessity be very long and exceedingly strong. Also, large ball bearings are required in order to be able to turn the swing arm.

One of the objects of the invention, therefore, is to eliminate these drawbacks in connection with hydraulically operated and electrically controlled cutting presses and to provide an arrangement which, by the employment of comparatively simple means, would reverse the flow of the hydraulic liquid at the termination of the cutting stroke, so that the column together with the pressure cylinder and the swing arm will be immediately returned into its initial position.

Cutting presses of this kind are also known, but in these machines the electro-hydraulic means for the reversal of the hydraulic liquid and the return of the swing arm are so complicated both in construction and installation as to be consistently subject to disturbances in a manner, that even small irregularities could not be corrected by the factory mechanics and hence experienced electrical experts have to be called.

The invention provides that the electro-hydraulic means which are used for the reversal of the liquid flow and the return of the swing arm will be so simplified in their construction and arrangement, and also in their mode of operation, that disturbances, except perhaps such as caused by wear, will practically be eliminated and, whenever they should happen, that they can easily be rectified.

This object in accordance with the invention is obtained by the provision, similar to the aforesaid semi-hydraulic cutting presses, of a solenoid valve which is so constructed that by the employment of only one solenoid valve the swing arm or platen together with its column and pressure cylinder, will be movable in both directions, namely, one for carrying out the cutting stroke and the other for the return stroke. For this purpose the invention provides for the arrangement of the solenoid valve as a four-way valve with two solenoids or magnets and a correspondingly shaped slide valve cooperating therewith. The vertical conduit in the machine column has been duplicated for this purpose, and the pressure cylinder provided with two separate chambers, which are alternately connected to carry out the cutting stroke and the return stroke.

Another feature of the invention consists in a novel stroke adjustment for the platen, of which the means for carrying out such adjustment are arranged in a known manner between a turnable member on the platen, such as a turning knob for instance, and a fixed part of the machine. The invention, for the purpose, provides a preferably truncated cone which is fixed to the top of the vertical spindle within the machine standard, and a feeler in contact with the slanted surface of the cone and slideable thereon during the movement of the platen. If these control means are to be used for regulating the cutting height, the cone has to be placed with its apex directed downwardly and the cutting plates on the platen and on the work support are to be connected to the electric circuit of the machine. When, on the other hand, the height of the cutting stroke of the platen is to be adjusted, the cone will have to be fixed on the spindle with its apex pointing upwardly whereupon the control of the solenoid valve will be effected in known manner by a switch adapted to be set or adjusted by the turning knob on the platen and brought into contact with the slanted surface of the cone.

Instead of providing ordinary cones with their apices directed downward or upward, as the case may be, the machine may be provided with a double-pointed cone, namely one having two apices pointing in mutually opposite directions, by means of which the height adjustment and the stroke adjustment can be effected simultaneously. Such adjustments can be initiated, as in the aforedescribed manner, by one or more adjusting members on the platen and one or more switches in communication therewith. In connection with the last-mentioned adjustment the invention also provides means, preferably likewise on the platen, for disconnecting one of the said adjusting members.

The accompanying drawings illustrate two embodiments of the invention by way of example.

In these drawings,

FIG. 4 is a section similar to FIG. 2 of the machine fitted with a double-pointed cone.

FIG. 5 is a cross section through the switch in the platen.

FIG. 6 is a detail and

FIG. 7 is a modified form of the switch gear in the platen.

Figure 1:
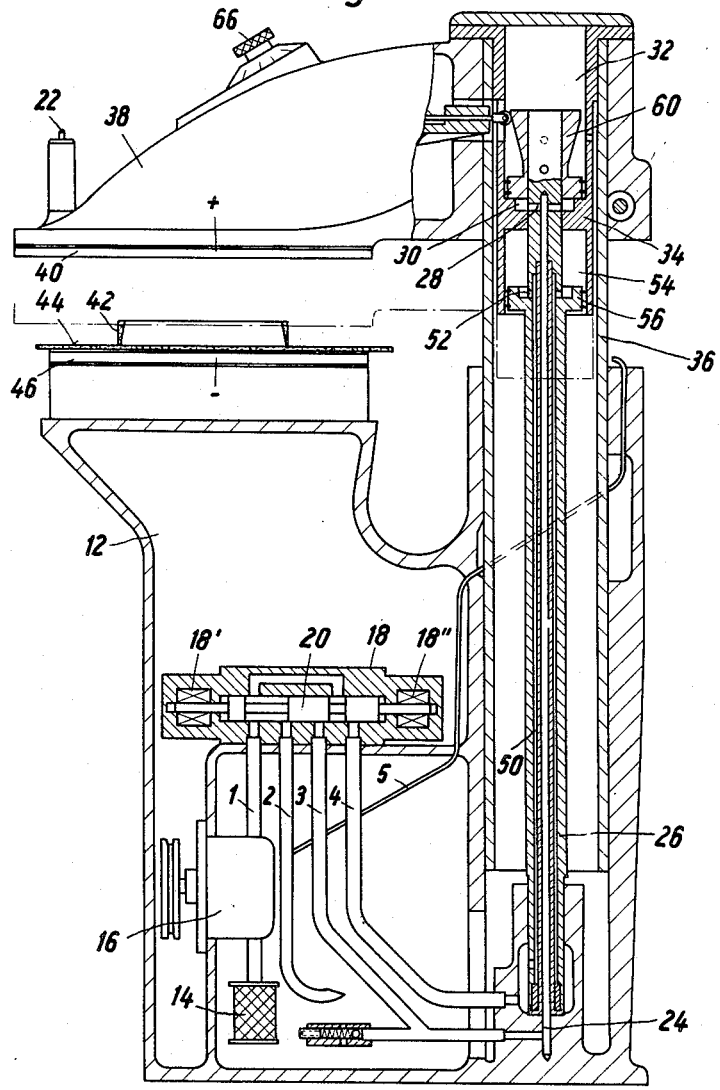
FIG. 1 is a longitudinal section through a machine having a four-way solenoid valve and a single cone for the adjustment of the cutting height.

Contained in the lower part of the machine standard 12 is the chamber for the hydraulic fluid, usually oil, in which is mounted a suction basket 14 fitted to a pump 16 and, outside the said chamber, a solenoid valve 18 having two magnets or solenoids 18′ and 18″ which are adapted to act on the valve control slide 20 within the valve casing. Oil is admitted to the valve through the pipe 1 and, when the machine runs idle, returned into the oil chamber by the pipe 2. A thin tube 5 is provided through which a small quantity of oil is conveyed by osmotic pressure sufficient to lubricate the machine column as shown in FIG. 1.

Pressing the starting switch 22 energizes the solenoid 18″ which pushes the slide 20 to the left (FIG. 1) so that the oil from the pump flows through the pipe 3 and the conduit 24 in the machine spindle 26 and through the cross passage 28 into the chamber 30 of the cylinder 32. It thereby forces the piston 34 together with the cylinder 30, 32 and the machine column 36 with the beam 38 downwardly. This downward movement continues until the cutting plate 40 of the beam 38 has caused the die 42 to penetrate the workpiece 44, whereupon an electric contact is established between the plate 40 and the cutting plate 46 on the work support through the die 42 so as to close a circuit over the solenoid valve 18, which is thereby reversed so that now the left side magnet 18′ becomes energized.

Simultaneously with the energizing of the left side magnet 18′, the right side magnet 18″ becomes deenergized and the slide 20 is pushed to the right (FIG. 1). The oil now flows via the pipe 4 through the conduit 50 of the machine spindle and the passages 52 of the lower cylinder 54, which is closed at its lower end by the stationary piston 56 on the machine spindle and forces the whole cylinder 32, 34 together with the column 36 and the beam 38 up into its original position as shown in FIG. 1. Here it is to be noted that at the termination of the aforedescribed cutting stroke the beam 38 and the cylinder 34 had occupied their lowermost position as indicated by the dot and dash lines in FIG. 1, and that they were now returned into their original position shown in full lines. The moment when this position is reached, a contact again is closed which reverses the solenoid valve 18 once more, so that the slide 20 returns into the idling position in which the oil admitted through the pipe 1 returns into the oil chamber by pipe 2.

For the adjustment of the cutting height of the beam or swing arm the following arrangement has been devised in which the conventional hand wheel is eliminated.

Figure 2:
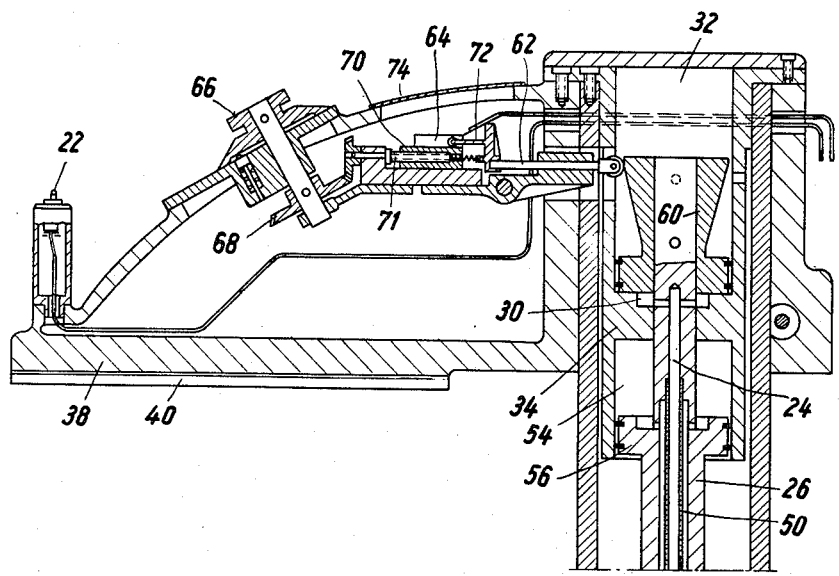
FIG. 2 is a section similar to FIG. 1 through the platen and the head of the machine.

Fitted to the upper end of the machine spindle 26 is an inverted truncated cone 60 which does not take part in the movement of the beam but remains stationary together with the spindle. The slanted surface of this cone is in sliding contact with the end roller of a spring-controlled contact rod 62 (FIG. 2) passing through a slot in the walls of the cylinder 54 and the column 36 and acting with its other end on a switch 64 which is adjustable by a turning knob 66 and gear wheels 68, or other transmission means, to the desired cutting height of the beam. The switch 64, which is accessible after the removal of the cover 74 on the platen is mounted upon a slide 70 which can be moved lengthways by turning the screw-spindle 71 as by means of the turning knob 66 and the bevel gears 68. The spacing between a contact pin 72 of the switch 64, which is moved by the contact rod 62 corresponds to the adjusted cutting height and, therewith, to the upper limit of the cutting stroke. A limitation of the cutting stroke at its lower end is not required because, as already explained, the cutting stroke is terminated at the moment when the workpiece is penetrated by the die 42 by the contact which is closed through the upper cutting plate 40, the die 42 and the work support 46 (FIG. 1).

The switch 64 serves to limit the cutting height to the amount which has been set by the turning knob 66 so that, at the end of the cutting stroke and the reversal of the position of the solenoid valve 18, the swing arm can return only up to this height. During the following descent of the beam the contact bar 62 and the contact pin 72 also descend corresponding to the amount of reduction in the diameter of the cone 60. The lowest position of the beam is attained at the moment when after the penetration of the sheet of material the contact closes between the two plates 40 and 46 via the die 42, whereupon the beam moves up again into the position which has been set by the turning knob. At this moment the contact pin 72 has come into engagement with the switch 64, which terminates the upward movement of the beam. This avoids unnecessary dead motion of the beam, since its upper position is preferably so adjusted that the required minimum height becomes exceeded by only a slight amount.

Figure 3:
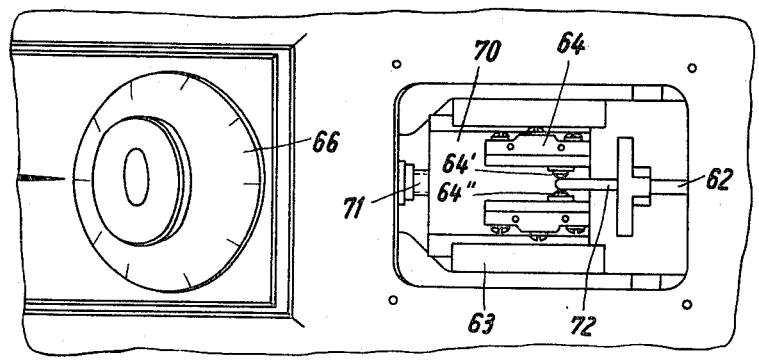
FIG. 3 is a plan view showing the rear part of the platen with the normally provided cover removed.

During prolonged intervals of rest, leakages in the packings may cause the beam gradually to sink down by slight amounts and for that reason the switch 64 is provided with two contact pieces 64′ and 64″ (FIG. 3). These contacts are slightly staggered in their positions to each other so that, when during a standstill of the machine the beam has lowered itself by its own weight to a predetermined amount, the cylindrical contact pin 72, which is in contact with one of the contact pieces, would eventually touch the second contact piece also and thereby switch the solenoid valve 18 into the circuit and thus raise the beam again by the previously sunken amount.

It may be said that the entire switch gear of the machine, including the switches, contactors, relays and so on, consists of known elements only and for that reason are not specifically illustrated.

While the aforedescribed example of the invention referred only to the adjustment of the cutting height of the beam and the parts connected thereto, it is evident, that the cone may also be used for the adjustment of the cutting stroke. For that purpose the control cone at the top of the machine spindle is not inverted but fitted to the spindle with its truncated apex directed upwards. The termination and reversal of the cutting stroke then takes place in known manner and in accordance with the adjustment of the switch 64 by the turning knob 66 at the moment in which the roller of the contact bar 62 reaches the position on the cone which corresponds to the adjusted position of the switch. In this case the cutting plates 40 and 46 need not be made of conductive material and neither need they be connected into the electric circuit.

The provision of a cone in an upright or an inverted position for the control of the cutting height or of the cutting stroke offers the further possibility of effecting both these adjustments simultaneously. The arrangement may be such that, if desired, one of the two adjusting means, for instance the one for adjusting the cutting height, may be made disconnectible.

An arrangement to serve this purpose is shown in FIGS. 4 to 6. Instead of a single cone, as in the foregoing example, a double cone 100 is fitted to the machine spindle consisting of the upper conical part 100′ and the lower, inverted conical part 100″. In communication with the upper part 100′ is a spring-controlled contact bar 101, while another similar contact bar 102 communicates with the lower conical part. The upper part serves for the adustment of the cutting stroke and the lower part for the adjustment of the cutting height as explained in the foregoing example. Adjustment of the cutting height or the cutting stroke is carried out preferably by the turning knob 66 along a graduated scale, as in the foregoing example, and a double switch 104 which is mounted above and below a supporting plate 103.

The upper switch 104′ with its terminals 116, 118 is moved fore and aft by means of the meshing bevel gears 68, 106 over the screw spindle 108 by means of the pins 110, whereby the spacing $x$ between the contact pin 112 of the switch 108 and the contact plate 114 of the contact bar 101 becomes larger or smaller in accordance with the cutting stroke as adjusted by the turning knob 66, so that the contact for the termination and the reversal of the cutting stroke is closed accordingly sooner or later. The two switches 104′ are preferably arranged in slightly staggered position to one another so that in the case of the control switch failing, the other, set back switch, would interrupt the circuit and cut out the motor so that the machine comes to a standstill.

Since the cutting height and the cutting stroke are in a predetermined ratio one to the other, the means which are provided to adjust the cutting stroke spindle 108 are made also to cause the adjustment of the cutting height spindle 120 which is fitted to the same valve supporting plate 103. This object is achieved by combining the gear wheel 106 of the upper spindle 108 with a pinion 106' (FIG. 6) and to provide another pinion 122 at the end of the spindle 120. Both pinions are normally in engagement with each other, so when the spindle 108 is turned by the knob 66, the other spindle 120 will also be turned. However, it is sometimes desired to disconnect the height adjustment, and for this purpose a clutch 124 is provided, of which the pinion 122 forms the loose part, while its fast part is fitted to the extended end of the spindle where it may be shifted in relation to the loose member by a fork 128 or the like. When the clutch is closed, the spindle 120 will be displaced together with the spindle 108 by the engagement of the gear wheels 106' and 122 for the simultaneous adjustment of the switches 104' and 104". In order to be able to disconnect the clutch and, therewith, the cutting height adjusting means, a second turning knob 126 or the like is provided and preferably also arranged on the cutting beam next to the turning knob 66. When the clutch is disconnected as by turning the knob 126, the pinion 122 runs loose on its spindle and no displacement of the latter and consequently no adustment by the cone part 100" (FIG. 4) takes place.

The lower switch 104" corresponds in regard of its function and arrangement with the already described switch 64 (FIG. 2), and it also serves the same purpose, namely to secure the adjusted cutting height by the roller at the end of the contact bar 102 moving along the inclined surface of the lower cone part 100". The contact bars 72 and 102 are preferably of round cross section as this has been found of advantage because, when changing from a long to a short stroke, the switches 104' and 104" have to slide along the said contact bars. When restarting the machine the contact bars contact with the switches 104 only with their ends.

Experience has shown that in practical work the cutting height is to be adjusted less frequently than the cutting stroke. Therefore the arrangement of the switch gear as illustrated in FIG. 6 can be simplified as shown in FIG. 7 by omitting the clutch and the pinions and by operating both switching means separately but by the same arrangement of the bevel wheels or other transmission means. In order to make this possible and to simultaneously simplify the switchgear, the spindle 120, which regulates the cutting height, will not be combined with the turning knob 66 and its spindle 108, but there will be provided an extended spindle 108a which is movable in the same manner as the stroke adjusting spindle 108 by means of a turning knob 66a or the like on the swing arm and the bevel gear 68a, 106a. In this way pinion 106 and the clutch 124 of FIGS. 4–6 can be omitted, which results not only in a simplification of the mechanism and a saving in the production costs, since the mutually similar parts 66, 66a and the bevel wheels 68, 68a and 106, 106a amount to increased production series, but also in the omission of other parts such as the somewhat intricate gear wheel 122 and the clutch together with its clutch lever, and other connected parts.

Another advantage of the machine according to the invention rests in that the spindle 26 together with its cone, piston 34, the cylinders 32, 54 and the tube 50 can be removed from the machine standard, after having removed the lid 31 by unscrewing the spindle and simply pulling the parts out at the top.

What I claim is:

1. An electrically controlled die cutting press, having a stationary work support and a platen, means for effecting movement of said platen relative to said work support, a stationary spindle at the rear of said work support, and means for varying the cutting height and the cutting stroke of the platen, comprising, a truncated double-pointed cone having oppositely directed apexes at the upper end of said spindle, a manually operable adjusting member outside on said platen for simultaneously varying the cutting height and the cutting stroke of the platen, an electric switch intermediate said adjusting member and one part of said double-pointed cone, two electric contacts on said switch one being slightly set back relative to the other, a displaceable contact member communicating with one part of said double-pointed cone and contacting with said two contacts at slightly different times so as to close a circuit only at the rearmost of said contacts being touched by said displaceable contact member, and another, similar switch intermediate said adjusting member and the other part of said double-pointed cone.

2. A die cutting press as set forth in claim 1, in which one of said switches communicates with the cutting height adjusting part of said double-pointed cone and the other switch with the cutting stroke varying part thereof.

3. In a die cutting press as set forth in claim 1, a common bearing block for supporting both the said switches, a separate guide for each of said switches, and means for shifting said switches along said guides each independently of the other.

4. An electrically controlled die cutting press, having a stationary work support and a platen, means for effecting movement of said platen relative to said work support, a stationary spindle at the rear of said work support, and means for varying the cutting height and the cutting stroke of the platen, comprising, a two-function member at the upper end of said spindle, a manually operable adjusting member outside on said platen for simultaneously varying the cutting height and the cutting stroke of the platen, an electric switch member intermediate said adjusting member and one part of said two-function member, another switch member intermediate said adjusting member and the other part of said two-function member, and means cooperating with said two-function member to operate said switch members in unison so as simultaneously to effect operation in the cutting height and of the cutting stroke in accordance with the setting of said adjusting member on the platen, a common bearing block for supporting both the said switches a separate guide for each of said switches, a screw threaded spindle for each of said switches rotatable in said block, a pin on each of said switches adapted to engage into the thread of its pertaining spindle, a gear wheel at one end of each of said spindles, and a gear wheel on said manually adjusting member in engagement with at least one of said gear wheels on said spindles.

5. An electrically controlled die cutting press, having a stationary work support and a platen, means for effecting movement of said platen relative to said work support, a stationary spindle at the rear of said work support, and means for varying the cutting height and the cutting stroke of the platen, comprising, a two-function member at the upper end of said spindle, a manually operable adjusting member outside on said platen for simultaneously varying the cutting height and the cutting stroke of the platen, an electric switch member intermediate said adjusting member and one part of said two-function member, another switch member intermediate said adjusting member and the other part of said two-function member, and means cooperating with said two-function member to operate said switch members in unison so as simultaneously to effect operation in the cutting height and of the cutting stroke in accordance with the setting of said adjusting member on the platen, and means for temporarily disconnecting one of said switches.

6. An electrically controlled die cutting press, having a stationary work support and a platen, means for effecting movement of said platen relative to said work support, a stationary spindle at the rear of said work support, and means for varying the cutting height and the cutting stroke of the platen, comprising, a two-function member at the upper end of said spindle, a manually operable adjusting member outside on said platen for simultaneously varying the cutting height and the cutting stroke of the platen, an electric switch member intermediate said adjusting member and one part of said two-function member, another switch member intermediate said adjusting member and the other part of said two-function member, and means cooperating with said two-function member to operate said switch members in unison so as simultaneously to effect operation in the cutting height and of the cutting stroke in accordance with the setting of said adjusting member on the platen, a clutch in cooperation with the cutting height varying switch for temporarily rendering the means for varying the cutting height inoperative.

7. An electrically controlled die cutting press having a stationary press member, a vertically movable platen, means including a double cone for controlling the cutting height and the cutting stroke of said platen, separately movable electric switches, an axially movable feeler intermediate each of said height and stroke control means and said switches, a manually turnable adjusting member outside of the platen for setting the position of said switches to the required distance away from said feelers, a rotary spindle for shifting the stroke adjusting switch, a gear wheel at one end of said spindle, a gear wheel on said manually turnable adjusting member in constant engagement with said gear wheel on the stroke adjusting switch spindle, a second rotary spindle for shifting the cutting height varying switch, a gear wheel at one end of said second spindle, a second turnable adjusting member outside on said platen in close proximity of said first adjusting member, and a gear wheel on said second manually adjustable member in constant engagement with the gear wheel on said second rotary spindle for moving said second spindle independently of the first.

8. An electrically controlled die cutting press as set forth in claim 7, in which the means for the adjustment of the cutting height are substantially the same as the means for varying the cutting stroke, save the length of the spindles which conforms with the distance away from each other of the manually turnable members on the outside of the platen.

References Cited by the Examiner
UNITED STATES PATENTS

| | | | |
|---|---|---|---|
| 1,883,766 | 10/32 | Cox et al. | 200—153.12 |
| 3,026,755 | 3/62 | Castle | 83—639 |
| 3,052,145 | 9/62 | Muller et al. | 83—639 |

FOREIGN PATENTS

| | | | |
|---|---|---|---|
| 1,261,661 | 4/61 | France. | |

ANDREW R. JUHASZ, *Primary Examiner.*